Sept. 2, 1947.   L. FRANKEL   2,426,823
CAMERA
Filed Sept. 18, 1944   2 Sheets-Sheet 1
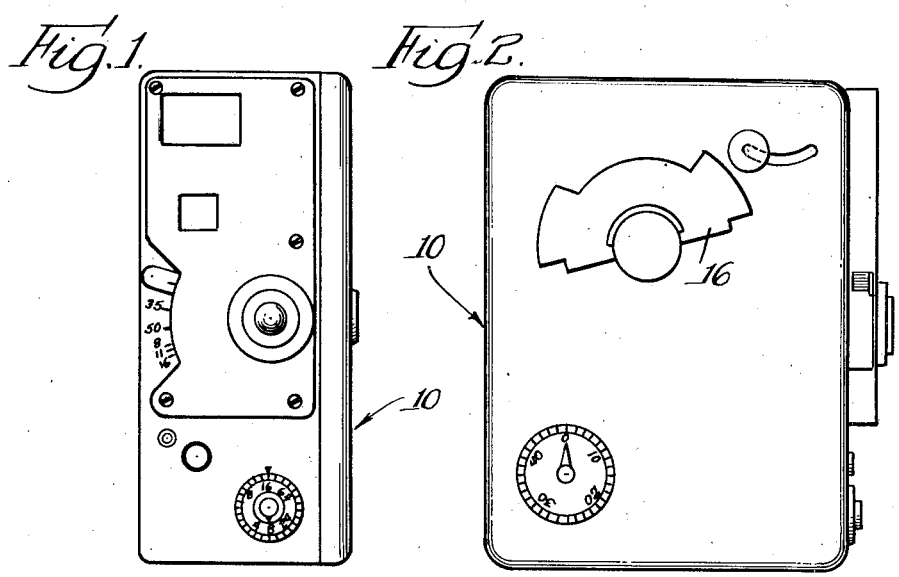
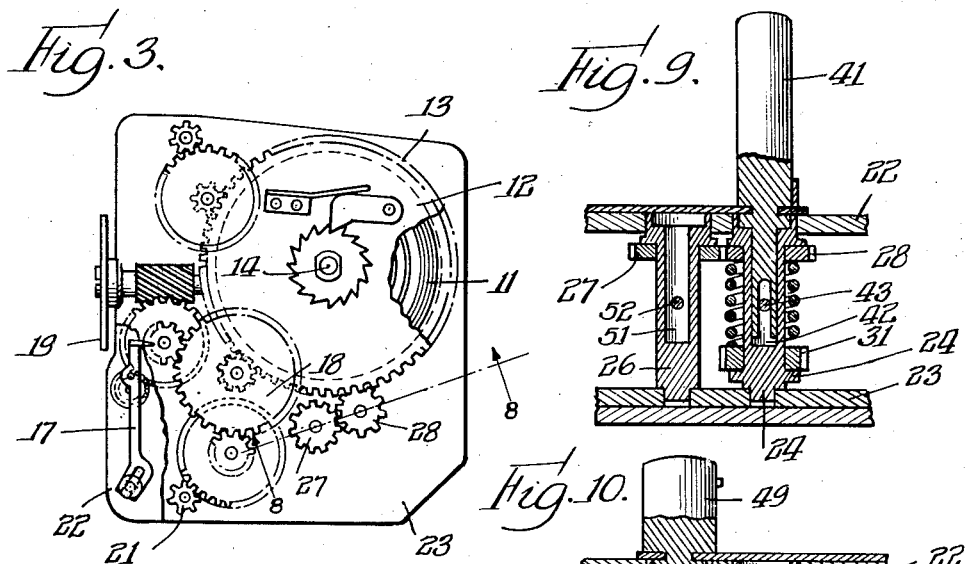
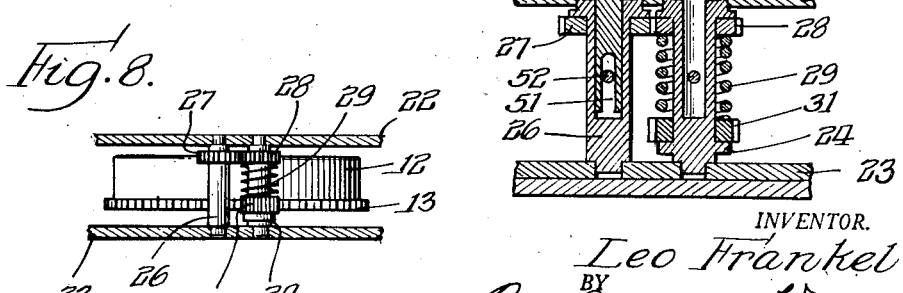
INVENTOR.
Leo Frankel Sept. 2, 1947.   L. FRANKEL   2,426,823
CAMERA
Filed Sept. 18, 1944   2 Sheets-Sheet 2

INVENTOR.
Leo Frankel
BY
McLaughlin & Wallenstein
Attys.

Patented Sept. 2, 1947

2,426,823

UNITED STATES PATENT OFFICE 2,426,823

CAMERA

Leo Frankel, Chicago, Ill.

Application September 18, 1944, Serial No. 554,571

8 Claims. (Cl. 88—17)

1

My invention relates in general to cameras and more in particular to a motion picture camera adapted to employ either film spools or film magazines.

In accordance with the general features of my invention, I employ a motion picture camera having the usual film transporting mechanism, shutter mechanism, lens and the like adapted for successively exposing sections of a film in a usual manner. Within the housing, I provide a support and drive for a film spool and a support for a feed spool, the two spools being, for example, of the type known in the industry as daylight film spools. I also provide adjustable means for converting the film containing portion of the housing for use with a film magazine, the stud and drive for the take-up spool being movable out of position and a stud and support for a magazine driven in an opposite direction to the spool stud being supportable in proper drive position; and the support for the feed spool being adjustable to a position in which it acts as a support for the film magazine.

My present invention is a continuation-in-part of application Serial No. 359,152, filed September 30, 1940, by me jointly with Ulrich R. Furst, now Patent No. 2,358,323, issued September 19, 1944.

In the drawings:

Fig. 1 is a front elevational view of a motion picture camera embodying the features of my invention;

Fig. 2 is a side elevational view thereof, looking at the right side of the camera;

Fig. 3 is an elevational view looking at the left side of the camera with the outer casing removed and some of the parts broken away to show construction;

Fig. 8 is a sectional view taken on the line 8—8 of Fig. 3, looking in the direction of the arrows;

Fig. 9 is a fragmentary sectional view taken on the line 9—9 of Fig. 4 looking in the direction of the arrows but with the spool removed; and Fig. 10 is a fragmentary sectional view taken on the line 10—10 of Fig. 6, looking in the direction of the arrows but with the film magazine removed.

Figure 4:
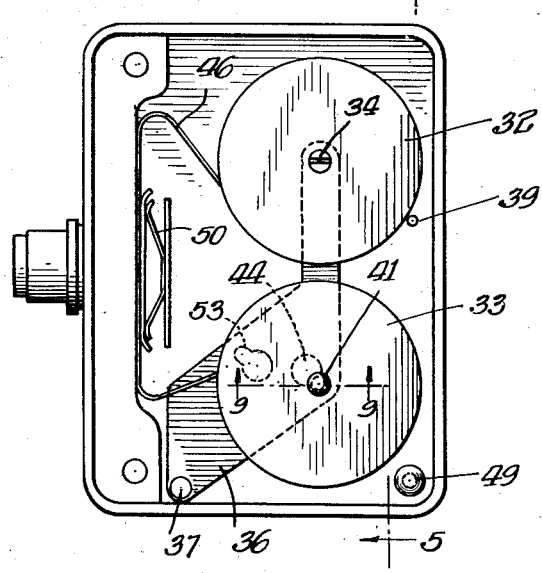
Fig. 4 is a side elevational view of the camera with a portion of the outer casing removed for the purpose of exposing the film carrying portion of the casing, the view showing a pair of spools in position.
Figure 5:
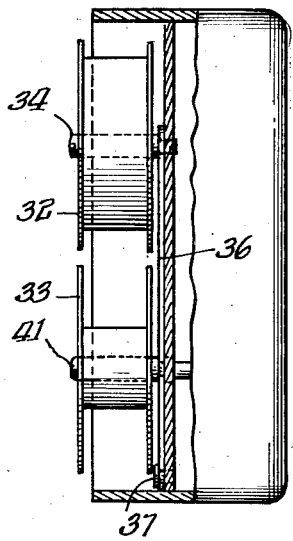
Fig. 5 is a sectional view taken on the line 5—5 of Fig. 4, looking in the direction of the arrows.
Figure 6:
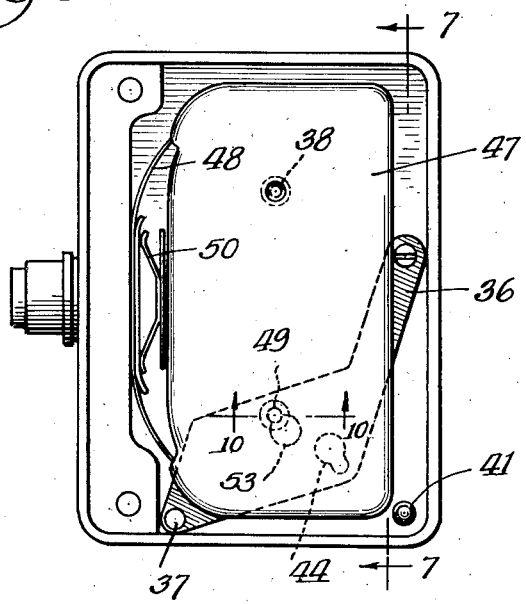
Fig. 6 is a view similar to Fig. 4 but showing a film magazine in position.
Figure 7:
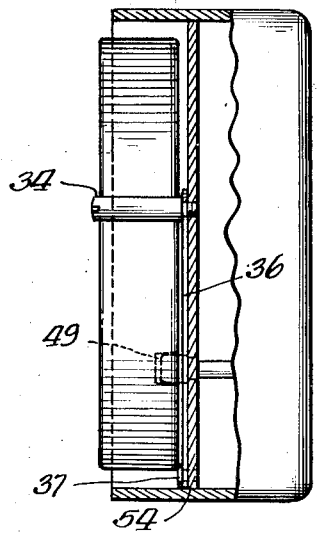
Fig. 7 is a sectional view taken on the line 7—7 of Fig. 6.

Referring now to the drawings, I show in Figs. 1 and 2 general views of a motion picture camera 10, the camera being of conventional type and embodying such features of construction and arrangement of parts as may commonly be found in motion picture cameras intended for amateur use.

In Fig. 3, I show how the drive for the magazine and spool are both taken from a main spring 11 of usual type, and in order to complete the view some additional parts are included, some of which will be referred to briefly for purposes of identification. In Fig. 3, the spring 11 is disposed in a case 12 on the outer periphery of which is disposed an external gear 13. One end of the spring 11 is attached in a conventional manner to the spring case 12 and the opposite end is secured to a shaft 14 adapted to be turned by a nut 16 (Fig. 2) for the purpose of winding the spring 11. A usual type of ratchet and pawl mechanism is provided in the manner shown.

A film transporting mechanism, including a claw 17, is driven by a gear train mechanism including gear 18 and a shutter 19 is also suitably synchronously driven, all from the external gear 13. A suitable governor mechanism is driven from shaft 21 which is also driven by a gear train taking its power from the main spring.

The mechanism indicated in Fig. 3 is carried between a pair of plates 22 and 23, it being understood that the plate 22 is removed from Fig. 3 in order to illustrate the parts beneath it. To furnish a drive for the film, I dispose between the plates 22 and 23 a pair of specially designed shafts 24 and 26 connected together by gears 27 and 28, fixed on their respective shafts. A spring 29, surrounding shaft 24, is compressed between gear 28 and a gear 31 journalled on shaft 24 and meshing with the external gear 13. Thus while the gear 31 meshes with the external gear 13 at all times, the shafts 24 and 26 are driven through the spring 29 which acts as a friction clutch between gears 31 and 28 and, therefore, between gear 31 and shaft 24.

Shaft 26 acts as a drive for a film mechanism and shaft 24 acts as a drive for a film spool. While both shafts are rotating at the same time, I provide separate driving and mounting studs which are removable and adjustable. The studs will be referred to in connection with the description of the spools and magazine more particularly illustrated in Figs. 4 to 7, inclusive.

In Fig. 4, I illustrate a feed spool 32 and take-up spool 33. The feed spool is mounted on a stud 34 journalled in a guard or locking plate 36 pivoted to the plate 22 by a screw 37. The stud 34 has a projecting lower end adapted to be threaded into a tapped hole 38 in the plate 22 when the camera is adjusted for the use of spools, or to be threaded into a tapped hole 39 when the camera is adjusted for the use of a film magazine.

The film take-up spool 33 is mounted on a stud 41, a lower narrow shank of which extends into a recess 42 in the shaft 24 and around a pin 43 extending transversely of such shaft. A slot 44 in the guard plate 36 has a portion of large and a portion of small diameter. When the stud 34 is inserted in the hole 38, the portion of the slot 44 of small diameter surrounds a neck portion of the stud 41, as shown in Fig. 9, to hold it in position. The stud 41 is initially inserted into the end recess of shaft 24 while the larger portion of the slot 44 is aligned therewith.

The film 46 disposed between the spools 32 and 33 extends into contact with the film transporting mechanism in a usual manner as indicated in Fig. 4.

The camera is adapted also to employ a film magazine 47, the film 48 of which is brought into contact with the film transporting mechanism including the claw mechanism in the usual manner. The magazine is mounted on stud 49 which extends into an end recess 51 in shaft 26 and engages around a transverse pin 52. A slot 53 in the guard plate 36 functions to hold the stud 49 in position in the same manner as previously described in connection with the slot 44 and the stud 41. The camera is so constructed and arranged that the magazine readily drops into position and is in a position to have the film thereof driven when the film magazine is mounted on the stud 49. When the magazine is being used, the stud 34 is not only removed out of position so that it will not be in the way of the film magazine but the stud assists in supporting the film magazine in proper position so as to avoid rattling. It will be noted that an aperture 54 in the lower right hand corner of the film compartment of the camera is adapted to receive either the stud 49 or the stud 41 and to retain either of such studs in position, depending upon whether the camera is adjusted for the use of daylight spools or a film magazine. I wish also to point out that the recesses for receiving the studs 41 and 49 and the studs themselves have a lower portion of restricted diameter and an upper portion (adjacent the guard and locking plate 36) of enlarged diameter. The portion of enlarged diameter in the two recesses is of different size so that one stud will not fit in the aperture intended for the other; but either stud will fit in the hole 54. The studs which project from the shafts 24 or 26, as the case may be, are of different dimension so that it is impossible to place the film spool on the stud which should receive the film magazine and also impossible to place the film magazine in driving contact with the stud which should receive the film spool. These studs can be thought of as continuations of the shafts with which they are adapted to be associated and, as previously described, drive in opposite directions. These features are utilized in such a way that fully standard types of spools and film magazines may be employed. It will be understood, however, that specially designed spools and magazines may be utilized, if desired.

In the drawings, I show the film guide 50 being utilized both with the spools and film magazine. Some types of magazines are constructed so as to require no film guide and since film guides are commonly constructed to be removable, I may, if desired, utilize a common type of removable spring guide 50 to adapt the camera for use with a film magazine of the type described.

I have disclosed and described specific form of my invention but the scope thereof is defined by the claims.

What I claim as new and desire to protect by Letters Patent of the United States is:

1. In a motion picture camera of the character described, a frame, a pair of shafts rotatably mounted in said frame, said shafts being adapted to support a film spool and a film magazine respectively, a main drive gear, spring means for operating said drive gear, a second gear meshing with said drive gear, said second gear being mounted on one of said shafts, a friction clutch connecting said second gear in drive relation with said last mentioned shaft, and means for connecting said shafts to each other in drive relation whereby the operation of said drive gear causes rotation of said shafts in opposite directions with respect to each other.

2. In a motion picture camera of the character described, a pair of rotatable members each provided with a recess therein, said recesses being of different shapes, a film spool supporting shaft adapted to be received within one of said recesses, a magazine supporting shaft adapted to be received within the other recess, mechanism on one of said members for rotating the other member, gear mechanism for rotating said first-mentioned member, and spring means for actuating said gear mechanism.

3. In a motion picture camera of the character described, a pair of rotatable members each provided with a recess therein, a film spool supporting shaft adapted to be received within one of said recesses, a magazine supporting shaft adapted to be received within the other recess, means for locking said spool supporting shaft in one recess, and means for locking said magazine supporting shaft in the other recess.

4. In a motion picture camera of the character described, a pair of rotatable members each provided with a recess therein, said recesses being of different shapes, a film spool supporting shaft adapted to be received within one of said recesses, a magazine supporting shaft adapted to be received within the other recess, and a locking plate mounted adjacent said members and equipped with a pair of slotted apertures therein, one of said apertures being adapted to receive and lock said spool supporting shaft in position, and the other aperture being adapted to receive and lock the magazine supporting shaft in position.

5. A motion picture camera as set forth in claim 4 wherein the locking plate is pivotally mounted and is equipped with a transverse upstanding projection thereon, said projection being adapted when said plate is in one position to provide a support for a feeding film spool and being adapted when said plate is in aonther position to provide additional support for the film magazine.

6. In a motion picture camera of the character described, a housing having a film containing portion, a flat plate pivoted in said housing portion, and adapted to be fastened in one of two positions by a threaded stud engageable in either of two threaded apertures, said stud forming a support for a supply spool when film spools are employed, and as a positioning member for a film magazine when a film magazine is employed, two recessed members rotatable in opposite directions, said recesses adapted to communicate with either of two openings provided in said flat plate, removable driving studs for a take-up spool and a film magazine projecting through an aperture in the said plate and locked therein by such plate, only one of such studs being in position at a time, and a supporting recess being covered by the plate.

7. In a motion picture camera of the character described, a housing having a film containing portion, a flat plate pivoted in said housing portion, and adapted to be fastened in one of two positions by a threaded stud engageable in either of two threaded apertures, said stud forming a support for a supply spool when film spools are employed, and as a positioning member for a film magazine when a film magazine is employed, two recessed members rotatable in opposite directions, said recesses adapted to communicate with either of two openings provided in said flat plate, removable driving studs for a take-up spool and a film magazine projecting through an aperture in the said plate and locked therein by such plate, only one of such studs being in position at a time, and its supporting recess being covered by the plate, and means within the housing for supporting either of said studs in non-driving position when withdrawn from its said recess.

8. In a motion picture camera of the character described, a housing having a film portion to receive either spools or a magazine, a stud for a supply spool, shiftable to a location to position one side of a film magazine, a pair of members rotatable in opposite directions, each having a stud receiving recess, a stud for a take-up spool releasably supportable in one of said recesses, and a driving stud for a film magazine supportable in the other of said recesses, and means for supporting either of said studs out of the path of film spools or magazine, as the case may be, when such stud is removed from its said recess.

LEO FRANKEL.

REFERENCES CITED

The following references are of record in the file of this patent:

UNITED STATES PATENTS

| Number | Name | Date |
| --- | --- | --- |
| 2,135,638 | Goldhammer | Nov. 8, 1938 |
| 2,184,331 | Becker et al. | Dec. 26, 1939 |
| 2,351,088 | Wilson et al. | June 13, 1944 |
| 2,026,960 | Branch | Jan. 7, 1936 |
| 2,358,323 | Frankel et al. | Sept. 19, 1944 |